(12) United States Patent
Green et al.

(10) Patent No.: US 8,737,532 B2
(45) Date of Patent: May 27, 2014

(54) SAMPLE RATE ESTIMATOR FOR DIGITAL RADIO RECEPTION SYSTEMS

(75) Inventors: Brian Green, Austin, TX (US); Javier Elenes, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 118 days.

(21) Appl. No.: 13/485,746

(22) Filed: May 31, 2012

(65) Prior Publication Data

US 2013/0322571 A1    Dec. 5, 2013

(51) Int. Cl.
*H03K 9/00* (2006.01)
*H04L 27/00* (2006.01)

(52) U.S. Cl.
USPC .......................................... 375/316; 375/256

(58) Field of Classification Search
USPC ........................................................ 375/316
See application file for complete search history.

(56) References Cited

U.S. PATENT DOCUMENTS

| | | | |
|---|---|---|---|
| 6,215,423 B1 * | 4/2001 | May et al. ........................ 341/61 |
| 7,295,567 B2 | 11/2007 | Tweed et al. | |
| 7,339,504 B1 | 3/2008 | Li | |
| 7,974,338 B2 | 7/2011 | Becker et al. | |
| 8,040,989 B2 | 10/2011 | Nekhamkin et al. | |
| 8,171,152 B2 * | 5/2012 | White et al. ................... 709/231 |
| 8,175,110 B2 | 5/2012 | Suzuki | |
| 8,223,820 B2 | 7/2012 | Rouxel | |
| 8,276,178 B2 | 9/2012 | Song et al. | |
| 8,405,532 B1 * | 3/2013 | Clark et al. ...................... 341/61 |
| 2006/0179095 A1 * | 8/2006 | Lo Muzio et al. ............. 708/300 |
| 2007/0046514 A1 * | 3/2007 | Mallinson et al. ............. 341/120 |
| 2008/0068234 A1 * | 3/2008 | Forman et al. ................... 341/61 |
| 2009/0190701 A1 * | 7/2009 | Nekhamkin et al. ........... 375/355 |
| 2009/0319065 A1 * | 12/2009 | Risbo ............................... 700/94 |
| 2010/0091922 A1 * | 4/2010 | Magrath ........................ 375/355 |
| 2011/0044414 A1 * | 2/2011 | Li ................................... 375/350 |
| 2011/0170544 A1 * | 7/2011 | Boora et al. ................... 370/392 |
| 2013/0003904 A1 * | 1/2013 | Elenes et al. .................. 375/350 |
| 2013/0129114 A1 * | 5/2013 | Lesso ............................... 381/98 |
| 2013/0170667 A1 * | 7/2013 | Katou .............................. 381/98 |

* cited by examiner

*Primary Examiner* — Erin File
(74) *Attorney, Agent, or Firm* — Meyertons, Hood, Kivlin, Kowert & Goetzel, P.C.; Erik A. Heter

(57) ABSTRACT

A method and apparatus for adjusting a sample rate for an asynchronous sample rate converter is disclosed. In one embodiment, an apparatus includes an asynchronous sample rate converter (ASRC) that is configured to receive a digital data stream provided at a first sample rate. The ASRC is configured to convert the digital data stream to a second sample rate at which it is output. The apparatus also includes a sample rate estimator coupled to an interface through which samples from the digital data stream are conveyed subsequent to conversion to the second sample rate. The sample rate estimator is further coupled to the ASRC, and configured to adjust the second sample rate based on information obtained from the interface.

19 Claims, 7 Drawing Sheets

SAMPLE RATE ESTIMATOR FOR DIGITAL RADIO RECEPTION SYSTEMS

BACKGROUND

1. Technical Field

This disclosure relates to digital radio communications systems, and more particularly, to circuitry for reconciling the time base embedded in a modulated signal to a time base of a digitizer in a receiver.

2. Description of the Related Art

Digital radio communications systems have become increasingly common in recent years. Two common forms of digital radio communications are the digital audio broadcast (DAB) system and HD (formerly Hybrid Digital) radio, both of which are used to transmit audio data. Digital radio communications systems that transmit video data are also becoming more commonplace.

In a digital radio communications system, source material is generated at a studio or other location and subsequently converted to a digital format. The resulting digital data may then be modulated. The conversion to digital and modulation of the source material may occur according to a first time base. As used herein, a definition of a time base may include the accuracy of the timekeeping provided by a particular clock or other timekeeping device. After modulation, the digitized source material may be conveyed to a transmitter, which in some cases is not co-located with the studio. The transmitter may upconvert the digitized, modulated source to a radio frequency (RF) signal that may then be transmitted over the airwaves. The transmission process may occur according to a second time base. The RF signal may be received at a receiver where it is subsequently downconverted to a baseband frequency and demodulated according to a third time base. The recovered source material may then be output through a speaker or provided to another device for further processing prior to playback.

SUMMARY OF THE DISCLOSURE

A method and apparatus for adjusting a sample rate for an asynchronous sample rate converter is disclosed. In one embodiment, an apparatus may be implemented as a digital radio tuner that includes an asynchronous sample rate converter (ASRC) configured to receive a digital data stream provided at a first sample rate. The ASRC may be configured to convert the digital data stream to a second sample rate at which it is output. The apparatus also includes a sample rate estimator coupled to an interface through which samples from the digital data stream are conveyed subsequent to conversion to the second sample rate. The sample rate estimator is further coupled to the ASRC, and configured to adjust the second sample rate based on information obtained from the interface.

In one embodiment, a digital radio tuner may include a first-in first-out buffer (FIFO) coupled between an output of the ASRC and the interface. A demodulator may pull samples from the digital data stream from the FIFO through the interface. The sample rate estimator may monitor the interface and/or FIFO to determine an average rate of data consumption by the demodulator. Based on the average rate of data consumption, the sample rate estimator may adjust the second sample rate of ASRC accordingly.

The sample rate estimator may use various techniques to determine the average rate of data consumption. In one embodiment, a digital radio tuner integrated circuit (IC) that includes the ASRC and the sample rate estimator may be coupled to the demodulator by a bus. The demodulator may act as a master on the bus while the digital radio tuner IC may act as a slave. The demodulator may be configured to pull samples from the FIFO (through the interface) in bursts. The sample rate estimator may use information related to the bursts of data to determine an average rate of data consumption over time, setting the second sample rate based on the determined average rate.

BRIEF DESCRIPTION OF THE DRAWINGS

Other aspects of the disclosure will become apparent upon reading the following detailed description and upon reference to the accompanying drawings in which.

Figure 1:
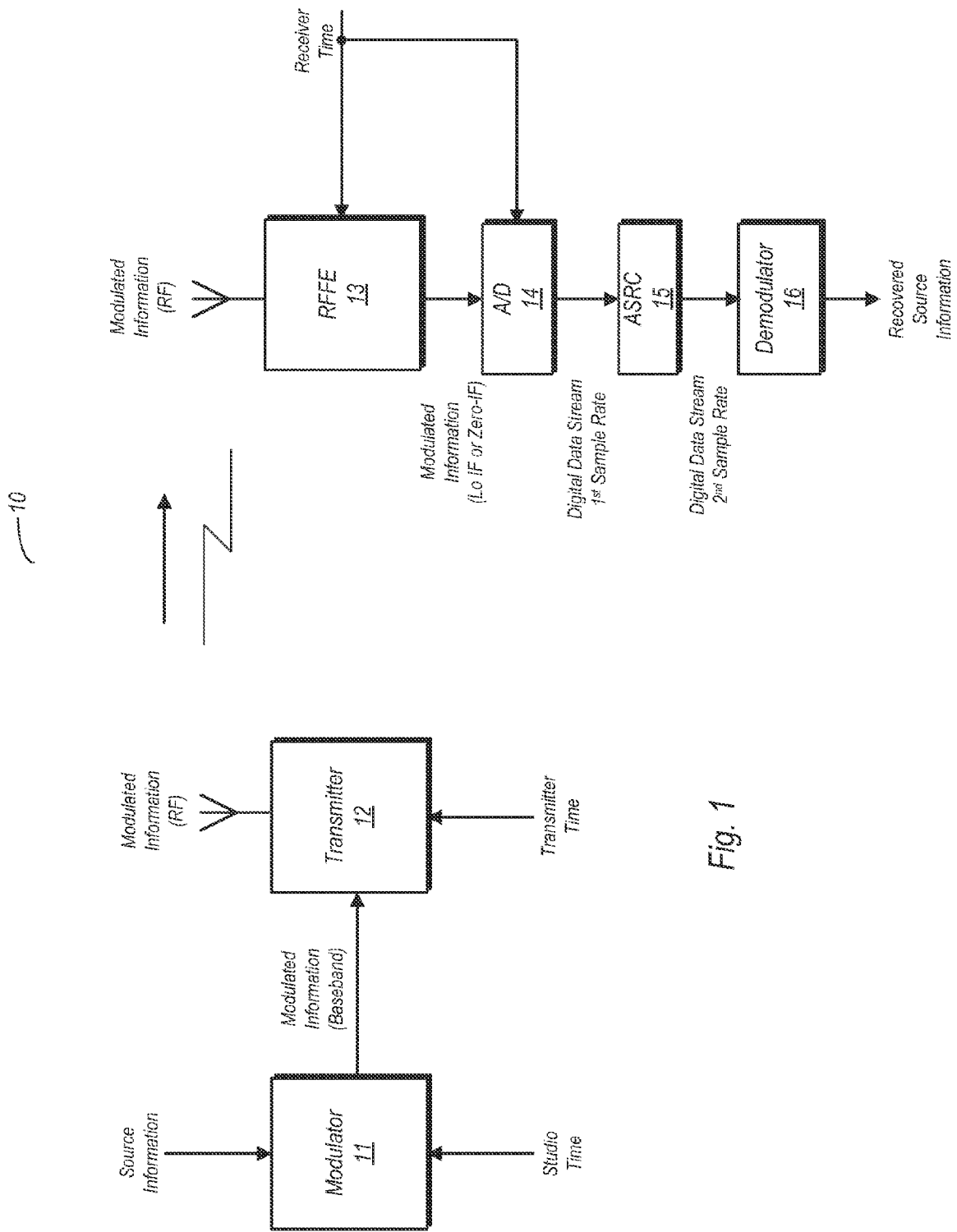
FIG. 1 is a block diagram of one embodiment of a digital radio communications system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Turning now to FIG. 1, a block diagram of one embodiment of a digital radio communications system. It is noted that only some of the components of the system are shown here, other components may also be present, and are discussed below.

Digital radio communications system 10 in the embodiment shown includes a modulator 11 coupled to receive source information. The source information may be audio information in some embodiments, but may also be video information, a combination of audio and video information, or any other type of information (e.g., text, images, etc.). The source information may be input into the modulator where it may generate a modulated signal at a baseband frequency. In one embodiment, the source information may be converted into a digital format prior to being conveyed to modulator 11. In other embodiments, the source material may be conveyed in an analog format and converted into corresponding digital data within modulator 11. Subsequent to conversion, the digital data may be used to generate a modulated signal at a baseband frequency. The resultant signal may be an analog signal having the digital data contained therein. The modulation of the source information may be performed in accordance with a studio time base.

After modulation, the modulated baseband signal may be conveyed to a transmitter 12. In one embodiment, transmitter 12 is not co-located with modulator 11. However, embodiments are possible and contemplated wherein modulator 11 and transmitter 12 are co-located. The modulated signal received by transmitter 12 may be up-converted from the baseband frequency to a radio frequency (RF) and subsequently transmitted over the airwaves. The up-conversion and transmission of the modulated RF signal may be performed in accordance with a transmitter time base.

The transmitted RF signal may subsequently be received by an RF front end (RFFE) 13 of a receiver unit. In one embodiment, the receiver may be a heterodyne receiver, and thus RFFE may downconvert the received signal to an intermediate frequency (IF; e.g., to a low-IF). In another embodiment, the receiver may be a direct conversion receiver, and thus the received signal may be downconverted to a baseband signal (sometimes known as a zero-IF receiver). In either case, RFFE 13 is configured to output a downconverted analog signal, which may be received by an analog-to-digital converter (A/D) 14. The analog signal received by A/D 14 may thus be converted into a corresponding digital data stream, which is output at a first sampling rate. In the embodiment shown, the reception, downconversion, and conversion to digital may be performed in accordance with a receiver time base.

The digital data stream output by A/D 14 in the embodiment shown is received by an asynchronous sample rate converter (ASRC) 15. ASRC 15 in the embodiment shown is configured to change the sampling rate of the digital data stream. More particularly, the digital data stream may be received by ASRC 15 at the first sampling rate (from A/D 14) and output at a second sampling rate. Although not explicitly shown, ASRC 15 may include an internal clock source that is adjustable to change the second sampling rate.

Samples of the digital data stream output by ASRC 15 may be received by demodulator 16. In some embodiments, a first-in, first-out buffer (FIFO) may be coupled between ASRC 15 and demodulator 16. In the embodiment shown, demodulator 16 may demodulate the incoming data and perform a subsequent conversion to analog. Additionally, in embodiments wherein RFFE downconverts the modulated RF signal to a corresponding modulated IF signal, demodulator 16 may perform a subsequent downconversion to a baseband frequency. In some embodiments, demodulator 16 may function in accordance with the same time base as RFFE 13 and A/D 14. In other embodiments, demodulator 16 may function in accordance with a time base separate from those units, as well as the other units discussed above.

As noted above, the different functions (e.g., modulation, transmission, reception, etc.) may be performed according to different time bases. For example, when the studio time is 2:00:00 PM, the transmitter time may be 2:00:05 PM, while the receiver time may be 2:00:03 PM, and so on. Furthermore, the accuracy of the clocks that establish the respective time base for each of these locations may be slightly different from the others. The discrepancy between these time bases can introduce frequency errors in the reception process, as well as issues with the source information at the point at which it is recovered by demodulator 16. For example, if the source information is audio, leaving the time base differences unresolved may lead to audio artifacts that can reduce the quality of audio playback. More generally, when left unresolved, the differences between the time bases may lead to a discrepancy between the number of samples needed for a smooth output by the demodulator and the number of samples actually received by the demodulator. In some cases, if the differences between the time bases remain unresolved, the modulation process may fail altogether. In various embodiments discussed below, this issue may be minimized by controlling the second sampling rate for the digital information output by ASRC. Embodiments discussed below include those in which control of the second sample rate may be enabled through information directly received by ASRC 15 from demodulator 16. Embodiment discussed below also include those in which control of the second sample rate is enabled by a rate estimator configured to obtain/extract information regarding an optimum sampling rate from the interface over which the digital data is conveyed from ASRC 15 to demodulator 16.

Figure 2:
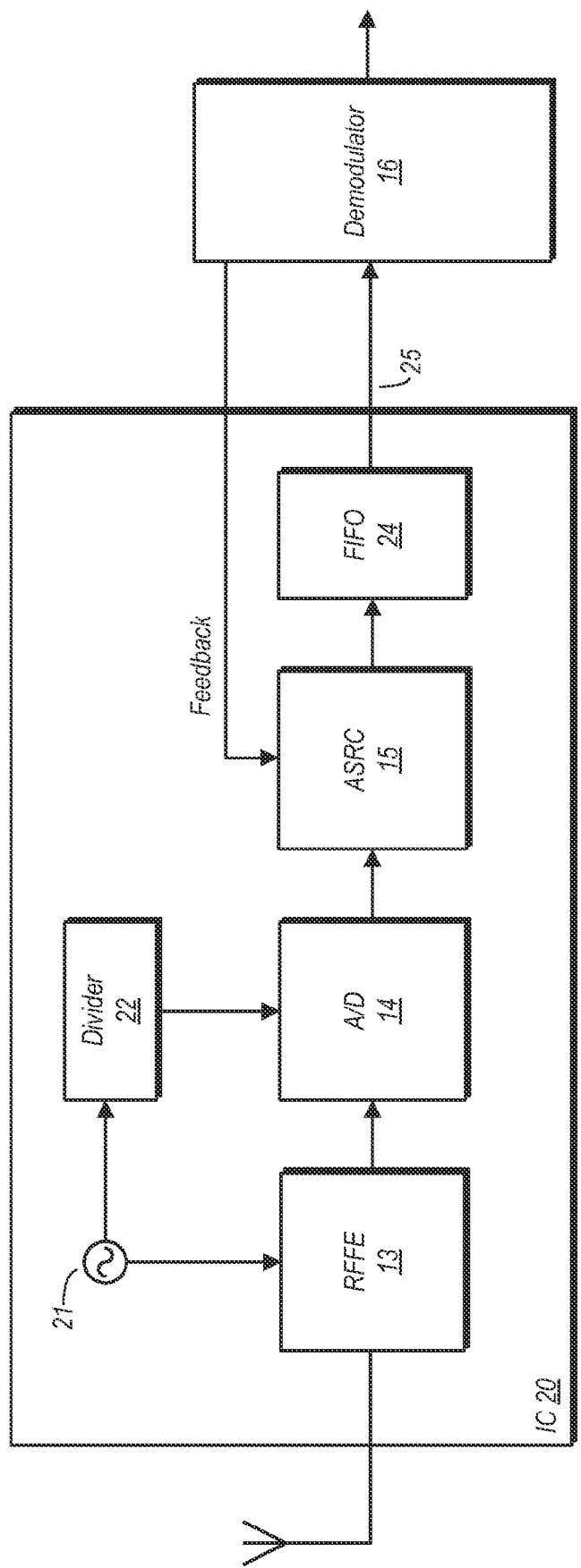
FIG. 2 is a block diagram of one embodiment of an integrated circuit implementing a digital radio tuner.

FIG. 2 is a block diagram of one embodiment of an integrated circuit implementing a digital radio tuner. In the embodiment shown, integrated circuit (IC) 20 is a digital radio tuner IC including RFFE 13, A/D 14, and ASRC 15. Also included on IC 20 is a FIFO 24, a local oscillator 21, and a divider 22. IC 20 may provide digital information to demodulator 16 via an interface 25.

In the embodiment shown, RFFE 13 is configured to receive an RF signal. The received RF signal may be downconverted to an IF signal (e.g., Low-IF) or to a zero-IF (baseband) signal. The downconversion may be performed in accordance with local oscillator 21, which is configured to generate and provide a periodic signal to RFFE 13. The periodic signal may be provided to a mixer within RFFE 13, which may also include other components including filters, automatic frequency control circuitry, and so on.

The downconverted signal may be provided in analog form from RFFE 13 to A/D 14. In the embodiment shown, A/D 14 is configured to convert the signal received from RFFE 13 into a corresponding digital data stream. The digital data stream may be converted to digital form at a first sampling rate. In the embodiment shown, divider 22 is coupled to receive the periodic signal output by local oscillator 21. The sampling rate at which the analog signal is converted to digital and output from A/D 14 is based on the frequency of the periodic signal received from divider 22.

The conversion of the analog signal into a digital data stream by A/D 14 may be conducted without regard to the time base upon which demodulator 16 is operating. Thus, the sampling rate of the digital data output from A/D 14 may be too fast or too slow relative to a rate of data consumption by demodulator 16. Accordingly, the embodiment of IC 20 shown in FIG. 2 implements ASRC 15. ASRC 15 may receive the digital data stream at the first sampling rate (i.e. the rate at which it is output from A/D 14) and convert it for output at a second sampling rate. In the embodiment shown, the second sampling rate may be set in accordance with feedback received by ASRC 15 directly from demodulator 16. In one embodiment, demodulator 16 may provide a digital feedback signal to ASRC 15. The digital feedback signal may include information indicative of a rate at which demodulator 16 is consuming information. In some embodiments, demodulator 16 may consume digital data received from IC 20 in bursts. In such embodiments, the digital feedback signal provided by demodulator may indicate an average rate of data consumption. Responsive to the feedback signal (and any change thereof), ASRC 15 may adjust the second sampling rate to match as closely as possible the rate of data consumption by demodulator 16.

The digital data stream, as output by ASRC 15 at the second sampling rate, may be received by FIFO 24. In the embodiment shown, FIFO 24 may provide temporary storage of samples of the digital data stream. The buffering of samples by FIFO 24 may provide flexibility such that demodulator 16 may pull samples in bursts.

Samples from the digital data stream may be conveyed from FIFO 24 to demodulator 16 over interface 25, which may be a bus. Various types of buses may be used to implement interface 25. In one embodiment, the bus may be an inter-IC sound bus (also known as I2S). In another embodiment, interface 25 may be a universal serial bus (USB). In general, interface 25 may be any suitable type of interface which enables the coupling of IC 20 to convey samples of digital data to demodulator 16. Furthermore, in addition to the bus types listed here, embodiments are possible and contemplated where interface 25 is a custom designed interface. Demodulator 16 may pull samples from FIFO 24 by sending direct requests, cycling a clock signal (when acting as a bus master in a master-slave configuration), or by any other suitable method.

Upon receiving the digital samples, demodulator 16 may, as noted above, demodulate and extract the source information from the digital data stream. The functions of demodulator 16 may also include downconversion from an IF to a baseband frequency in some embodiments. Conversion from digital to analog may also be performed in some embodiments, while other embodiments may be configured to output the source information in digital format for later conversion. Upon being output from demodulator 16, the source information may undergo final processing (e.g., volume control, equalization, etc.) before its final output (e.g., to speakers of an audio system).

Figure 3:
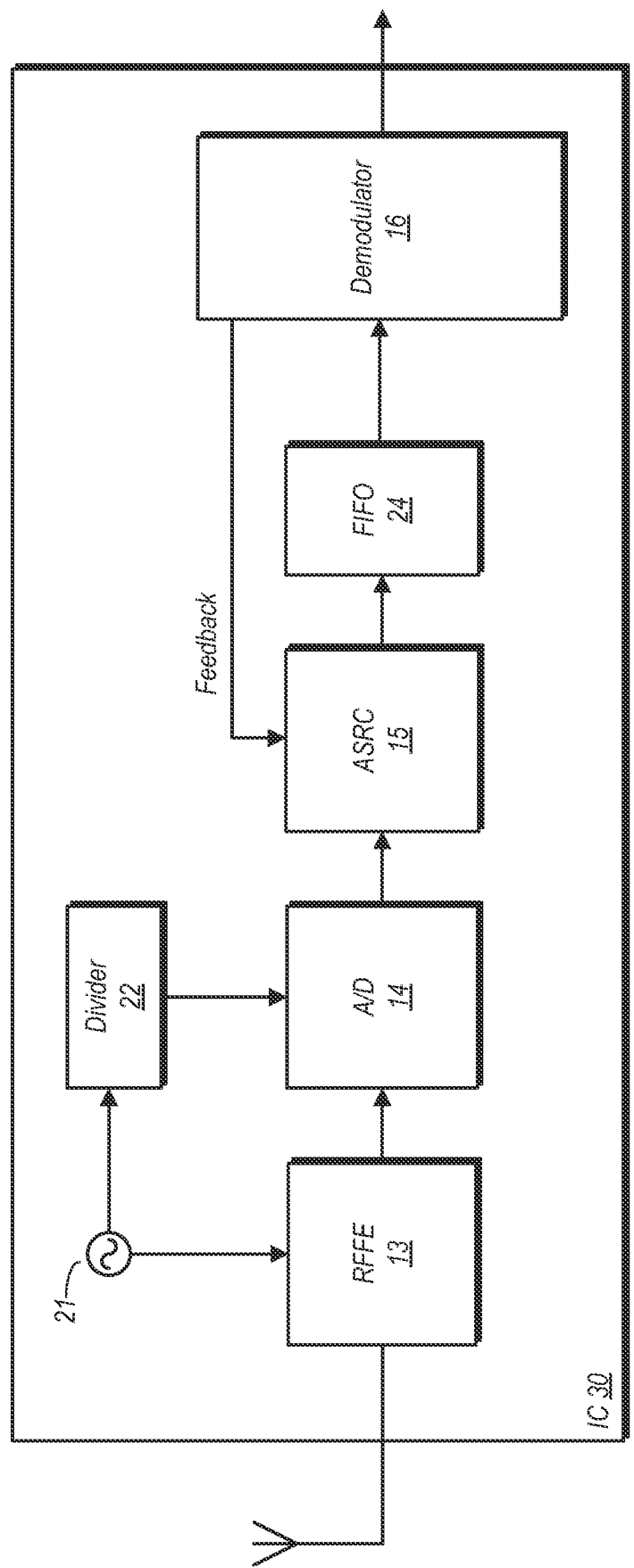
FIG. 3 is a block diagram of a second embodiment of an integrated circuit implementing a digital radio tuner.

FIG. 3 is another embodiment of an IC implementing a digital tuner. The primary difference between IC 30 of FIG. 3 and IC 20 of FIG. 2 is that demodulator 16 is implemented on the former. In both cases, RFFE 13, A/D 14, and ASRC 15 are implemented on a single IC. Furthermore, in both cases, the functions performed by ASRC 15 are separate from those performed by demodulator 16. Separating the function of sample rate conversion from the functions performed by demodulator 16 may significantly reduce the processing workload of the latter. In particular, relocating the function of sample rate conversion may ensure that demodulator 16 receives digital samples at or close to an optimum rate. This in turn may allow for simplification of the design of demodulator 16, and may also reduce memory requirements therein (e.g., since FIFO 24 is also located separately).

Figure 4:
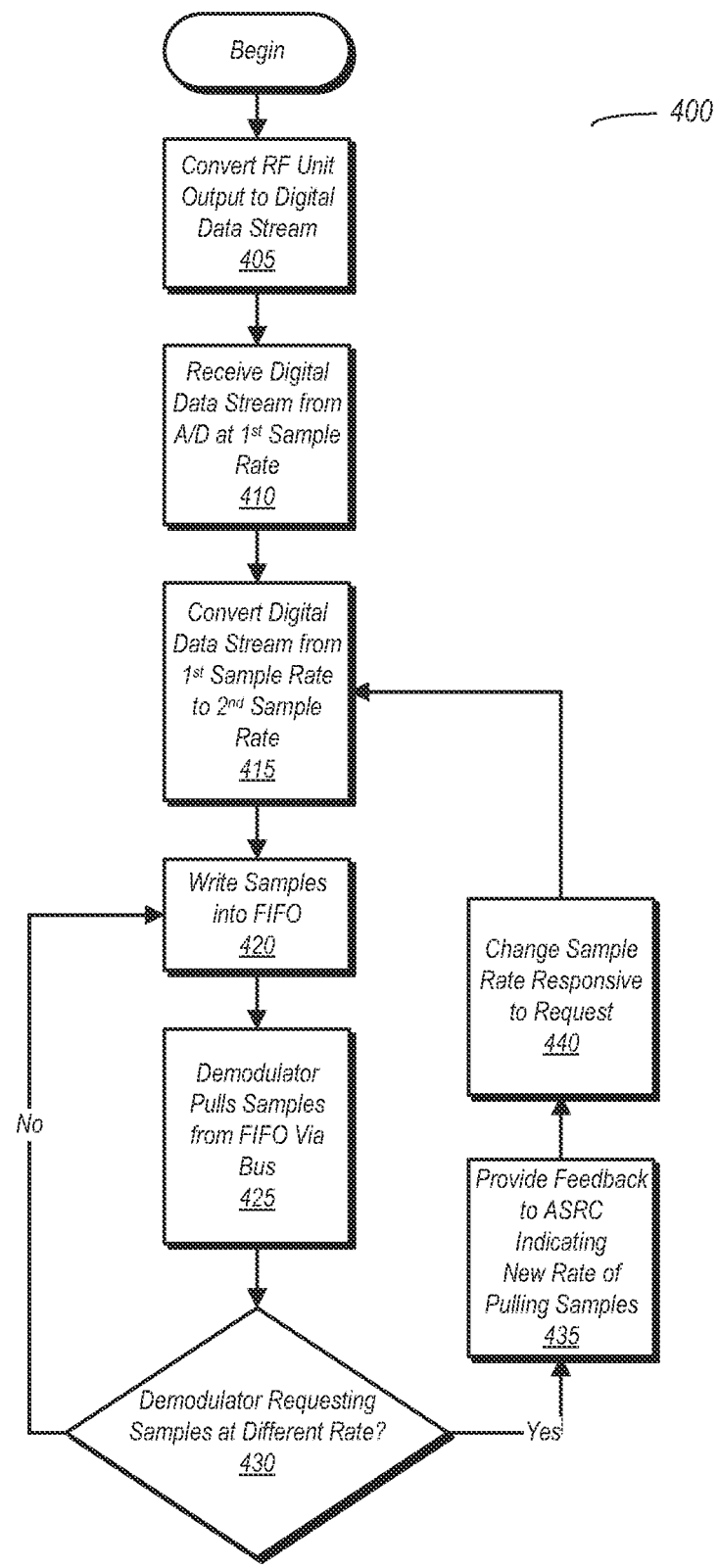
FIG. 4 is a flow diagram illustrating the operation of a digital radio tuner according to one embodiment.

Turning now to FIG. 4, a flow diagram illustrating the operation of a digital radio tuner according to one embodiment is shown. The digital radio tuner may correspond to one of the embodiments discussed above in reference to FIGS. 2 and 3, and may thus include a radio unit (e.g., RFFE 13), an A/D 14, and an ASRC 15 implemented thereon.

Method 400 begins with the conversion of an analog signal output by an RF unit into a digital data stream (block 405). The analog signal may correspond to a modulated RF signal received by the RF unit. The modulated RF signal may be downconverted to an IF or a baseband frequency to produce the analog signal. The analog signal may then be received by an analog-to-digital converter and converted into the digital data stream. The conversion and output of the digital data stream may occur at a first sampling rate. The digital data stream may then be received, at the first sampling rate, by an ASRC (block 410).

Upon receiving the digital data stream, the ASRC may perform a conversion from a first sampling rate to a second sampling rate (block 415). For example, the ASRC may receive the digital data stream at 44 k samples per second, and convert the digital data stream to a sampling rate of 48 k samples per second. The exact sample rates may vary from one embodiment to the next, as well as from one instance of operation to another. The digital data stream may be output from the ASRC at the second sampling rate. As samples are output from the ASRC, they may be written into a FIFO (block 420) for temporary storage.

A demodulator may pull samples from the FIFO via a bus interface (block 425). More particularly, the demodulator may perform an action that causes a read pointer of the FIFO to read out samples of digital data onto the bus where they are subsequently received by the demodulator. In one embodiment, the demodulator may request samples in bursts (i.e. a group of samples, followed by an absence of activity on the bus until the next group is sent). In such an embodiment, while the demodulator is not consuming data at a steady rate, it nonetheless may be consuming data at a relatively steady average rate over time. Optimally, the average rate may be as close as possible to the second sampling rate. This may ensure that the FIFO buffer is not subject to a buffer overflow or underrun.

During operation, the demodulator may begin requesting data at a different rate. If the demodulator begins requesting data at a different rate (block 430, yes), then it may change the state of the feedback signal in order to indicate to the ASRC the new rate at which the demodulator is pulling samples (block 435). Responsive to detecting a change in the state of the feedback signal, the ASRC may adjust the second sampling rate to be as close as possible to the new rate at which the demodulator is pulling samples and thus consuming data (block 440). Thereafter, sample rate conversions performed at block 415 may convert the digital data stream to the new second sampling rate. Otherwise, if the demodulator continues to pull samples at its current rate (i.e. with no change; block 430, no), then the ASRC may continue writing samples to the FIFO at the current second sampling rate.

Figure 5:
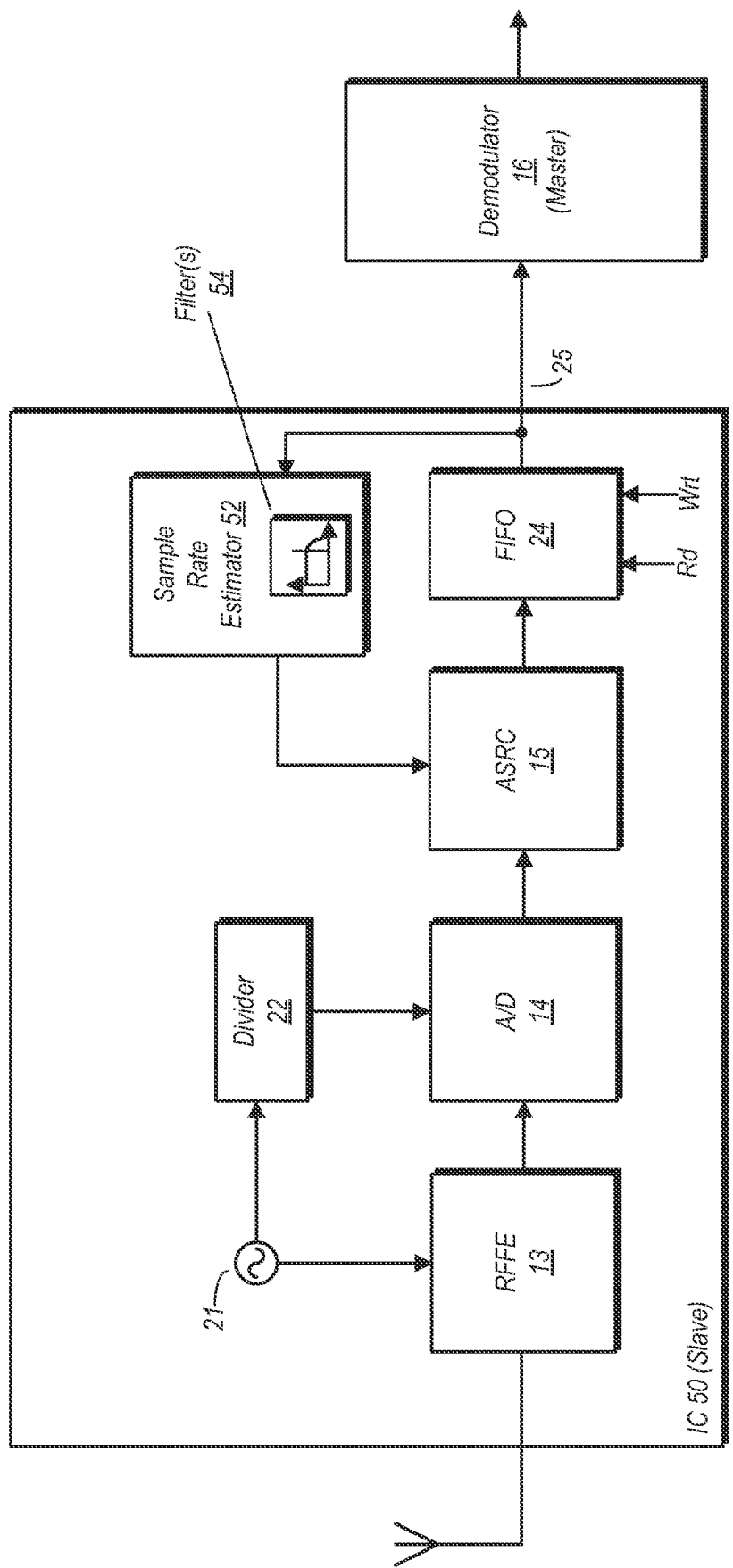
FIG. 5 is a block diagram of a third embodiment of an integrated circuit implementing a digital radio tuner.

FIG. 5 is a block diagram of another embodiment of an IC implementing a digital radio tuner. In contrast to the embodiments of a tuner IC shown in FIGS. 2 and 3, ASRC 15 of IC 50 shown in FIG. 5 is not coupled to receive a feedback signal directly from demodulator 16. Moreover, IC 50 in the embodiment shown does not provide any path facilitating direct communication between demodulator 16 and ASRC 15. The embodiments of a tuner IC shown in FIGS. 2 and 3 may correspond to circuits in which the tuner (including the ASRC) and the demodulator are cooperatively designed and developed. In contrast, the design of IC 50 may correspond to a circuit in which the tuner (including the ASRC) was not cooperatively developed with the demodulator. Accordingly, the embodiment shown in FIG. 5 does not include the direct feedback link from demodulator 16 to ASRC 15.

IC 50 includes RFFE 13, A/D 14, local oscillator 21, and divider 22. These functional units may perform largely the same functions as their equivalents discussed above. ASRC 15 may also function in a similar manner as described above, converting the sampling rate of a digital data stream from a first sampling rate to a second sampling rate. However, ASRC 15 in IC 50, as noted above, is not configured to receive direct feedback from demodulator 16. Instead, ASRC 15 of IC 50 is configured to receive information regarding the desired second sampling rate from sample rate estimator 52, which is discussed below.

In the embodiment shown, IC 50 is coupled to demodulator 16 via an interface 25. Examples of an interface for coupling IC 50 to demodulator 16 include, but are not limited to, the I2S bus and USB. In the arrangement shown in FIG. 5, IC 50 may act as a slave in a master-slave configuration, while demodulator 16 may act as a master. Since the master device controls data transmissions on the bus in such a configuration, samples of digital data are forwarded from IC 50 to demodulator 16 only at the request of the latter. Furthermore, since there is no direct communication link between demodulator 16 and ASRC 15, an alternate method of determining the output sampling rate of ASRC 15 is provided.

IC 50 in the embodiment shown includes a sample rate estimator 52 coupled to the interface 25 and/or FIFO 24. Sample rate estimator 52 may determine an average rate of data consumption by demodulator 16 based on information obtained from monitoring interface 25 and/or monitoring the read and write pointers of FIFO 24. The determined average rate of data consumption by demodulator 16 may be used as a basis for setting the output sampling rate of ASRC 15 (i.e. the second sampling rate).

As previously noted, demodulator 16 in various embodiments may be configured to request samples of digital data in bursts. That is, demodulator 16 may request a number of samples in a short period of time, followed by a period of quiet in which no samples are requested. This cycle may repeat itself indefinitely during operation of the digital radio system in which demodulator 16 and IC 50 are implemented. Sample rate estimator 52 in the embodiment shown may be configured to determine the average rate of data consumption over a number of bursts, and may cause ASRC 15 to adjust the second sample rate accordingly.

Figure 6:
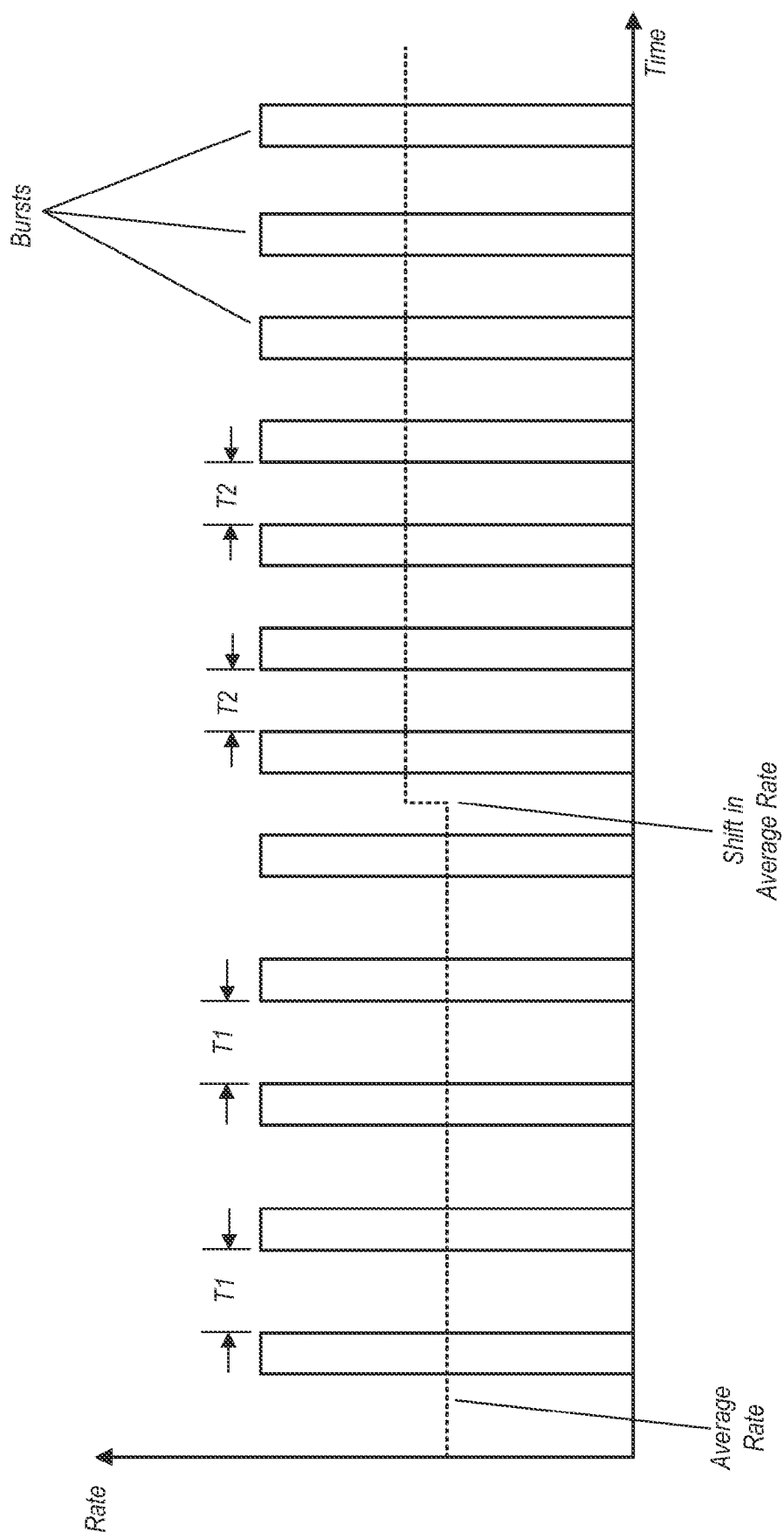
FIG. 6 is a diagram illustrating the operation of one embodiment of a digital radio tuner coupled to a demodulator configured to request data in bursts.

Turning briefly to FIG. 6, a timing diagram is shown that illustrates operation for one embodiment. In the example shown, a number of bursts of digital data samples are conveyed. Within each of the given bursts in this example, data is transferred (and consumed) at the same approximate rate. In the left hand portion of the diagram, a time interval T1 exists between each of the bursts. During this time interval, no data is transferred from IC 50 to demodulator 16 and the interface is thus idle. While the rate of data transfer varies from a given rate (during bursts) to idle (i.e. no zero data transfer), over time an average rate of data transfer (shown by the dashed line) may be determined. In this example, the average rate of data consumption by demodulator 16 may be determined by integrating over a sufficient number of bursts. Accordingly, in one embodiment, sample rate estimator 52 may be configured to integrate over a number of bursts to determine the average rate of data consumption by demodulator 16.

On the right-hand side of the drawing in FIG. 6, the interval between bursts of data is reduced to an interval T2. Accordingly, since the idle interval is smaller, the average rate of data consumption by demodulator 16 is increased. Sample rate estimator 52 may be configured to detect this rate change and may thus cause ASRC to adjust the second sample rate accordingly.

Returning to FIG. 5, sample rate estimator 52 includes one or more filters 54. In one embodiment, sample rate estimator 52 includes a combination of linear and non-linear filters. These filters 54 may be configured to filter out instantaneous changes to the sampling rate (e.g., at the beginning or end of a burst) while still enabling detection of the change of the average rate of data consumption. Moreover, filters 54 may be utilized in performing integrations and/or other calculations to determine the average rate of data consumption as well as to detect shifts in the average rate. Using the determined average rate of data consumption by demodulator 16, sample rate estimator 52 may provide information to ASRC 15 indicating the appropriate second sample rate. ASRC 15 may thus set and/or adjust the second sample rate accordingly.

Sample rate estimator 52 may utilize various information obtained from interface 25 in performing the calculations to determine the average rate of data consumption. In one embodiment, interface 25 is an I2S bus. Acting as the master, demodulator 16 may cycle a clock signal on the I2S bus in order to synchronize the transfer of samples from FIFO 24. When no samples are to be transferred (i.e., during the idle period between bursts), the clock signal may be idle. Thus, in one embodiment, sample rate estimator may monitor the clock signal mastered by demodulator 16 on the I2S bus in order to obtain information that can be used to determine the average rate of data consumption. In one embodiment, the one or more filters 54 of sample rate estimator 52 may be coupled directly to the I2S bus and may be utilize to perform integrations or other calculations to determine the average rate of data consumption by demodulator 54.

In another embodiment, interface 25 may be a USB interface, with demodulator 16 acting as the master and IC 50 acting as the slave. Transfers of samples from FIFO 24 may be performed responsive to requests for data conveyed by demodulator 16. During bursts, demodulator may send a request, receive the corresponding data, send another request, and so on. The request-transfer cycle may continue for the duration of the burst. Once a given burst is complete, demodulator 16 ceases sending request and the USB becomes idle for a time interval. In this example, sample rate estimator 52 may be coupled to the data path of the USB interface, and may monitor requests sent by the demodulator, the amount of data returned by FIFO 24, or both. Based on the information obtained from the USB interface, sample rate estimator 52 may determine the average rate of data consumption by demodulator 16.

In general, any suitable interface may be used to couple IC 50 to demodulator 16. Thus, in a given embodiment, sample rate estimator 52 may be coupled to interface 25. Information may be obtained from the interface 25 and may be used by sample rate estimator 52 to determine an average rate of data consumption by demodulator 16 and to cause an appropriate adjustment by ASRC 15 of the second sample rate.

FIFO 24 in the embodiment shown includes a read pointer ('Rd') and a write pointer ('Wrt'). The read pointer in the embodiment shown advances responsive to reads of samples initiated by demodulator 16. The write pointer in the embodiment shown advances responsive to writes of samples into FIFO 24 from ASRC 15. If demodulator 16 reads samples from FIFO 24 in bursts, then over the short term, the read and write pointers advance at different rates. Accordingly, the read and write pointers may be initially positioned such that the write pointer does not overtake the read pointer and thus cause unread data to be overwritten. Furthermore, FIFO 24 may be sized such that, matching the second sample rate as close as possible to the average rate of data consumption of demodulator 16 may cause both pointers to advance at the same average rate over time.

Figure 7:
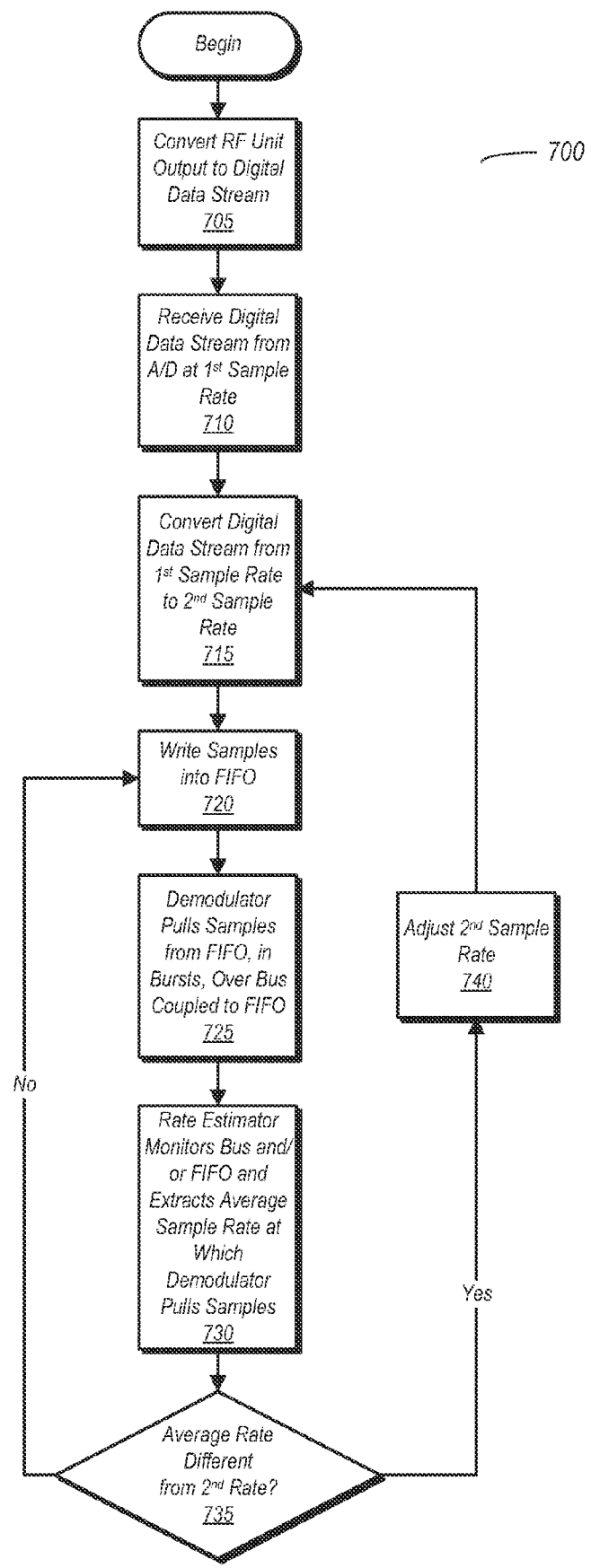
FIG. 7 is a flow diagram illustrating the operation of a digital radio tuner according to an embodiment.

FIG. 7 is a flow diagram illustrating the operation of a digital radio tuner according to an embodiment. More particularly, method 700 may apply to the embodiment shown in FIG. 5 and similar embodiments in which there is no direct feedback from a demodulator to an ASRC. Method 700 also applies, in this embodiment, to an apparatus in which a demodulator is configured to pull samples in bursts from a tuner IC.

Method 700 begins with the conversion of an analog signal output by an RF unit into a digital data stream (block 705). The analog signal may correspond to a modulated RF signal received by the RF unit. The modulated RF signal may be downconverted to an IF or a baseband frequency to produce the analog signal. The analog signal may then be received by an analog-to-digital converter and converted into the digital data stream. The conversion and output of the digital data stream may occur at a first sampling rate. The digital data stream may then be received, at the first sampling rate, by an ASRC (block 710).

Upon receiving the digital data stream, the ASRC may perform a conversion from a first sampling rate to a second sampling rate (block 715). Samples from the digital data stream, output from the ASRC at the second sampling rate may be written into a FIFO (block 720) for temporary storage.

The demodulator may pull samples of digital data from the FIFO, in bursts (block 725), over a bus coupled between the demodulator and the tuner IC. The demodulator and tuner IC may act as master and slave devices, respectively, with regard to the bus coupled therebetween. Thus, the demodulator may control the transfer of data from the FIFO (implemented on the tuner IC) over the bus.

A rate estimator coupled to the bus and/or FIFO may receive information therefrom. The information may include bursts of a clock signal, requests for samples originating from the demodulator, data transfers, and so forth. Using the information received from the bus and/or FIFO, the rate estimator may extract an average rate at which the demodulator pulls samples from the FIFO (block 730). The average rate may be calculated over a number of bursts to ensure that its accuracy is not reduced by any single burst. Calculation of the average rate may include, in one embodiment, integrating over a number of bursts.

The rate estimator may provide information indicative of the average rate calculation to the ASRC. If the calculated average rate is different from the second sampling rate as output from the ASRC (block 735, yes), then the second sampling rate may be adjusted (block 740). More particularly, the second sampling rate may be adjusted to be as close as possible to the calculated average rate. This may reduce the likelihood that data is overwritten or that the FIFO becomes empty. As long as the average rate that the demodulator pulls samples from the FIFO remains the same (block 735, no), then the second sampling rate may remain the same.

While the present invention has been described with reference to particular embodiments, it will be understood that the embodiments are illustrative and that the invention scope is not so limited. Many variations, modifications, additions, and improvements to the embodiments described are possible. These variations, modifications, additions, and improvements may fall within the scope of the inventions as detailed within the following claims.

What is claimed is:

1. An apparatus comprising:
    an asynchronous sample rate converter (ASRC) configured to receive a digital data stream at a first sample rate and output the digital data stream at a second sample rate;
    a demodulator coupled to the ASRC output; and
    a sample rate estimator configured to calculate an average rate of data consumption by the demodulator;
    wherein the ASRC is further configured to adjust the second sample rate based on the calculated average rate.

2. The apparatus as recited in claim 1, wherein the sample rate estimator is configured to determine the average rate of data consumption by the demodulator coupled to receive the digital data stream output by the ASRC.

3. The apparatus as recited in claim 2, wherein the sample rate estimator is configured to determine the average rate of data consumption by the demodulator based on a clock signal originating from the demodulator.

4. The apparatus as recited in claim 2, wherein the rate estimator includes at least one filter coupled to the interface.

5. The apparatus as recited in claim 1, further comprising a first-in first-out buffer (FIFO) coupled to receive, at the second sample rate, the digital data stream from the ASRC, wherein the FIFO is configured to output the digital data stream through the interface.

6. The apparatus as recited in claim 5, wherein the FIFO is configured to provide samples from the digital data stream through the interface responsive to cycling of a clock signal originating from the demodulator, and wherein the FIFO is configured to provide samples in bursts responsive to the demodulator bursting the clock signal.

7. The apparatus as recited in claim 5, wherein the FIFO, the rate estimator, and the ASRC are implemented on a single integrated circuit.

8. The apparatus as recited in claim 5, wherein the sample rate estimator is configured to determine the average rate of data consumption by the demodulator based on the read and write pointers in the FIFO.

9. The apparatus as recited in claim 8, further comprising:
    a radio frequency (RF) unit implemented on the integrated circuit, wherein the RF unit is configured to receive a radio signal at a first frequency and to output a corresponding analog signal at a second frequency; and
    an analog-to-digital converter (ADC), wherein the ADC is configured to convert the analog signal into the digital data stream.

10. The apparatus as recited in claim 9, further comprising:
    an oscillator coupled to provide a first periodic signal to the RF unit;
    a divider coupled to receive the first periodic signal from the oscillator and configured to output a second periodic signal to the ADC having a frequency less than that of the first periodic signal, wherein the first sampling rate is based on the frequency of the second periodic signal.

11. A method, comprising:
    receiving, at an asynchronous sample rate converter (ASRC), a digital data stream at a first sample rate;
    outputting the digital data stream from the ASRC at a second sample rate;
    obtaining information from an interface coupled to a demodulator, wherein the demodulator is configured to receive the digital data stream output from the ASRC;
    determining the second sample rate, using a sample rate estimator, based on an average rate of data consumption by the demodulator using the information obtained from the interface; and
    adjusting the second sample rate based on the average rate of data consumption by the demodulator.

12. The method as recited in claim 11, further comprising determining the average rate of data consumption by the demodulator based on a clock signal originating from the demodulator.

13. The method as recited in claim 11, further comprising:
    a first-in first-out buffer (FIFO) receiving the digital data stream at the second sampling rate from the ASRC; and
    the FIFO providing samples from the digital data stream responsive to the demodulator cycling a clock signal, wherein the clock signal is cycled in bursts.

14. The method as recited in claim 13, further comprising determining the average rate of data consumption by the demodulator based on values of the read and write pointers in the FIFO.

15. The method as recited in claim 11, further comprising:
    a radio frequency circuit receiving a radio signal at a first frequency and outputting a corresponding analog signal at a second frequency;
    an analog-to-digital converter (ADC) converting the analog signal into the digital data stream; and
    the ADC outputting the digital data stream at the first sample rate to the ASRC.

16. An integrated circuit, comprising:
    an asynchronous sample rate converter (ASRC) configured to receive a digital data stream at a first sample rate and output the digital data stream at a second sample rate;

a first-in first-out buffer (FIFO) coupled to receive the digital data stream from the ASRC and configured to output samples of the digital data stream through an interface of the integrated circuit;

a demodulator coupled to receive samples of the digital data stream from the FIFO;

a sample rate estimator coupled to the interface and configured to control the second sample rate based on information obtained from the interface, wherein the sample rate estimator is configured to calculate an average rate of data consumption by the demodulator; and wherein the ASRC is configured to adjust the second sample rate based on the calculated average rate of data consumption.

17. The integrated circuit as recited in claim 16, wherein the FIFO is configured to provide bursts of samples of the digital data stream to the demodulator responsive to the demodulator cycling the clock signal in bursts.

18. The integrated circuit as recited in claim 16, wherein the sample rate estimator is configured to determine the average rate of data consumption based on values of read and write pointers in the FIFO.

19. The integrated circuit as recited in claim 16, further comprising:

a radio frequency circuit configured to receive a radio signal at a first frequency and further configured to generate an analog signal at a second frequency, the analog signal corresponding to the radio signal; and an analog-to-digital converter (ADC) configured to convert the analog signal into the digital data stream and further configured to output the digital data stream to the ASRC at the first sample rate.

* * * * *